United States Patent
Jones

(10) Patent No.: US 10,703,291 B2
(45) Date of Patent: Jul. 7, 2020

(54) CENTER CONSOLE SYSTEM

(71) Applicant: Joseph Jones, Hendersonville, NC (US)

(72) Inventor: Joseph Jones, Hendersonville, NC (US)

( * ) Notice: Subject to any disclaimer, the term of this patent is extended or adjusted under 35 U.S.C. 154(b) by 148 days.

(21) Appl. No.: 15/826,113

(22) Filed: Nov. 29, 2017

(65) Prior Publication Data

US 2019/0161018 A1    May 30, 2019

(51) Int. Cl.
*B60R 7/04*    (2006.01)
*B60N 3/10*    (2006.01)

(52) U.S. Cl.
CPC .............. *B60R 7/04* (2013.01); *B60N 3/10* (2013.01); *B60N 3/101* (2013.01)

(58) Field of Classification Search
CPC .................................. B60R 7/04; B60N 3/10
USPC .................. 296/37.8, 37.14, 37.15, 1.09
See application file for complete search history.

(56) References Cited

U.S. PATENT DOCUMENTS

| | | |
|---|---|---|
| 319,730 A | 6/1885 | Largent |
| 2,926,828 A | 3/1960 | Kuddie |
| D188,415 S * | 7/1960 | Scheurer ........................ 224/926 |
| 3,561,589 A | 2/1971 | Larkin, Jr. |
| D248,056 S * | 5/1978 | Nepper ......................... D12/419 |
| D251,035 S * | 2/1979 | Hart .............................. D12/421 |
| 4,143,800 A * | 3/1979 | McCaffrey ............... B60N 3/08 224/42.11 |
| D271,541 S * | 11/1983 | Rockwell ..................... D12/419 |
| D281,545 S * | 12/1985 | Flanagan ..................... D12/419 |
| 4,798,360 A | 1/1989 | Alter |
| D302,356 S * | 7/1989 | Bell ............................. D12/424 |
| 4,915,275 A * | 4/1990 | Brown ..................... B60N 3/08 224/540 |
| D351,585 S * | 10/1994 | Scheurer ..................... D12/424 |
| 5,799,850 A | 9/1998 | Ryder |
| 7,490,886 B1 | 2/2009 | Walke |

* cited by examiner

*Primary Examiner* — Jason S Morrow
*Assistant Examiner* — E Turner Hicks

(57) ABSTRACT

A center console system for enhancing storage space in a vehicle includes a vehicle that has a front bench, a floor and a center console that is hingedly coupled to the front bench. The center console is selectively positioned in a deployed position having the center console being horizontally oriented and being centrally positioned on the front bench. The center console is selectively positioned in a stored position having the center console being vertically oriented. A storage unit is provided and the storage unit is selectively positioned on the floor when the center console is positioned in the stored position. In this way beverage containers and other objects may be stored when the center console is in the stored position.

5 Claims, 4 Drawing Sheets

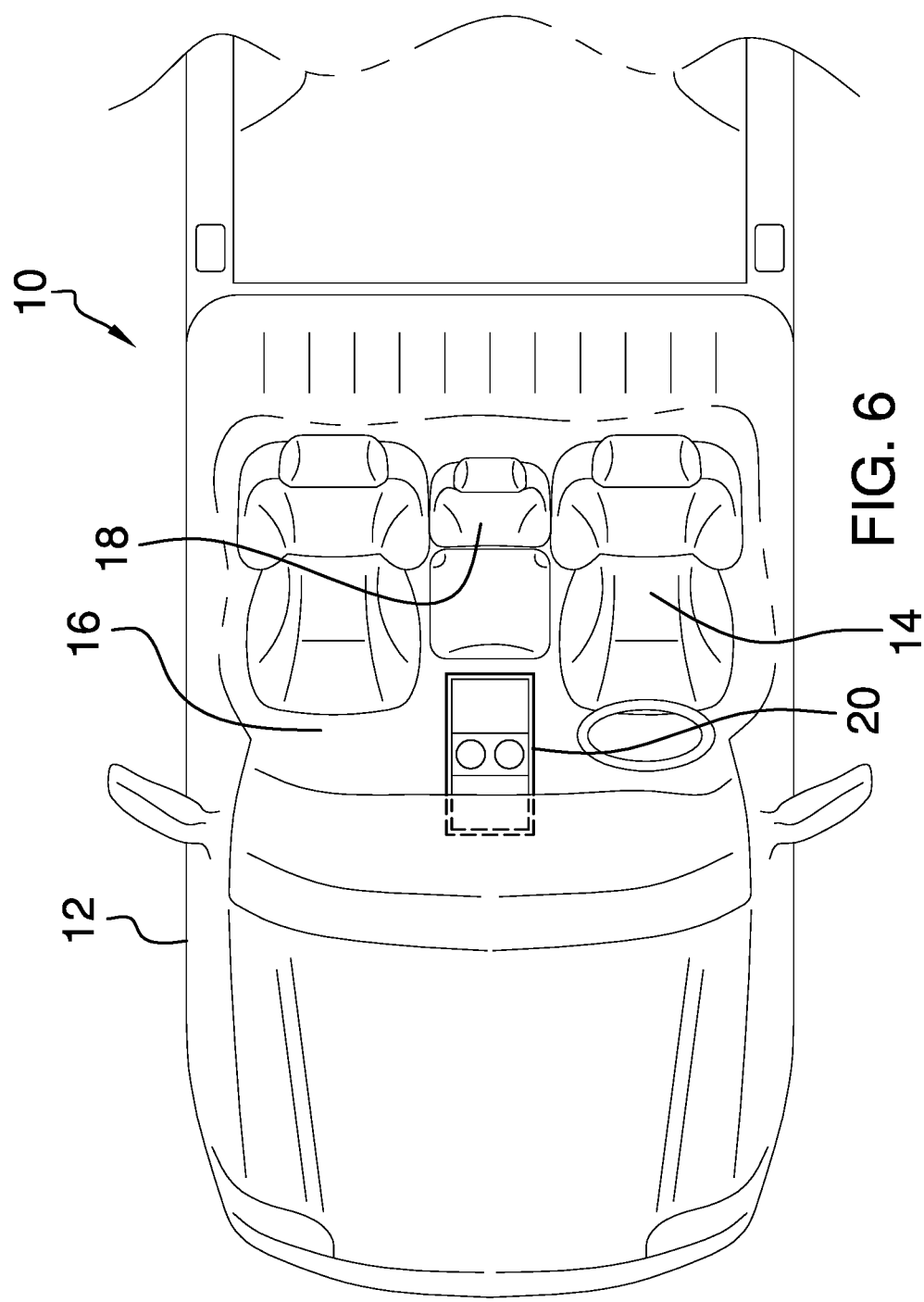

CENTER CONSOLE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to console devices and more particularly pertains to a new console device for enhancing storage space in a vehicle.

BRIEF SUMMARY OF THE INVENTION

An embodiment of the disclosure meets the needs presented above by generally comprising a vehicle that has a front bench, a floor and a center console that is hingedly coupled to the front bench. The center console is selectively positioned in a deployed position having the center console being horizontally oriented and being centrally positioned on the front bench. The center console is selectively positioned in a stored position having the center console being vertically oriented. A storage unit is provided and the storage unit is selectively positioned on the floor when the center console is positioned in the stored position. In this way beverage containers and other objects may be stored when the center console is in the stored position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 6 is a perspective in-use view of an embodiment of the disclosure.

DETAILED DESCRIPTION OF THE INVENTION

Figure 1:
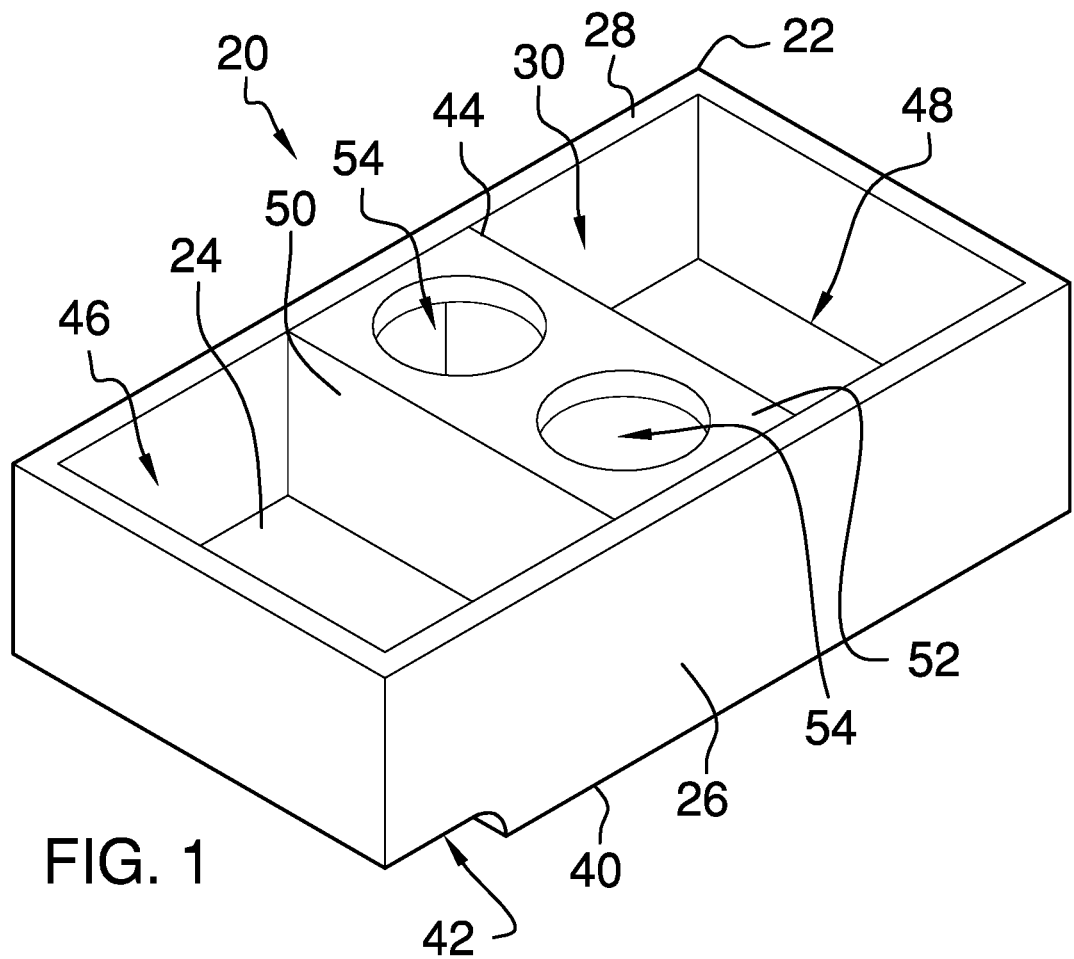
FIG. 1 is a front perspective view of a storage unit of a center console system according to an embodiment of the disclosure.
Figure 2:
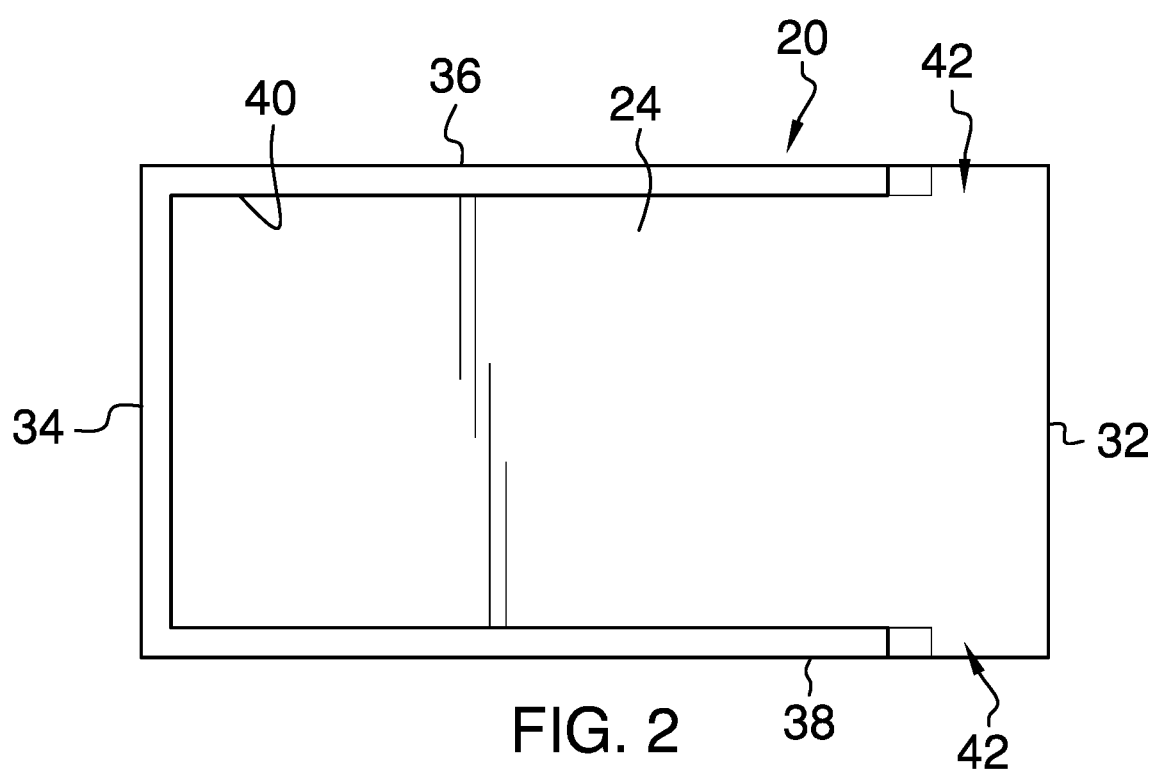
FIG. 2 is a bottom view of a storage unit of an embodiment of the disclosure.
Figure 3:
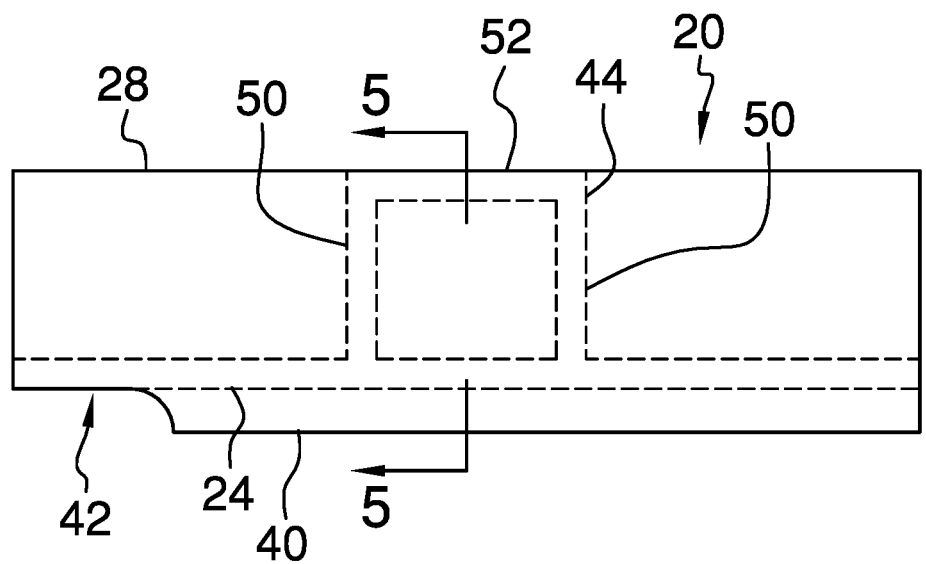
FIG. 3 is a left side phantom view of a storage unit of an embodiment of the disclosure.
Figure 4:
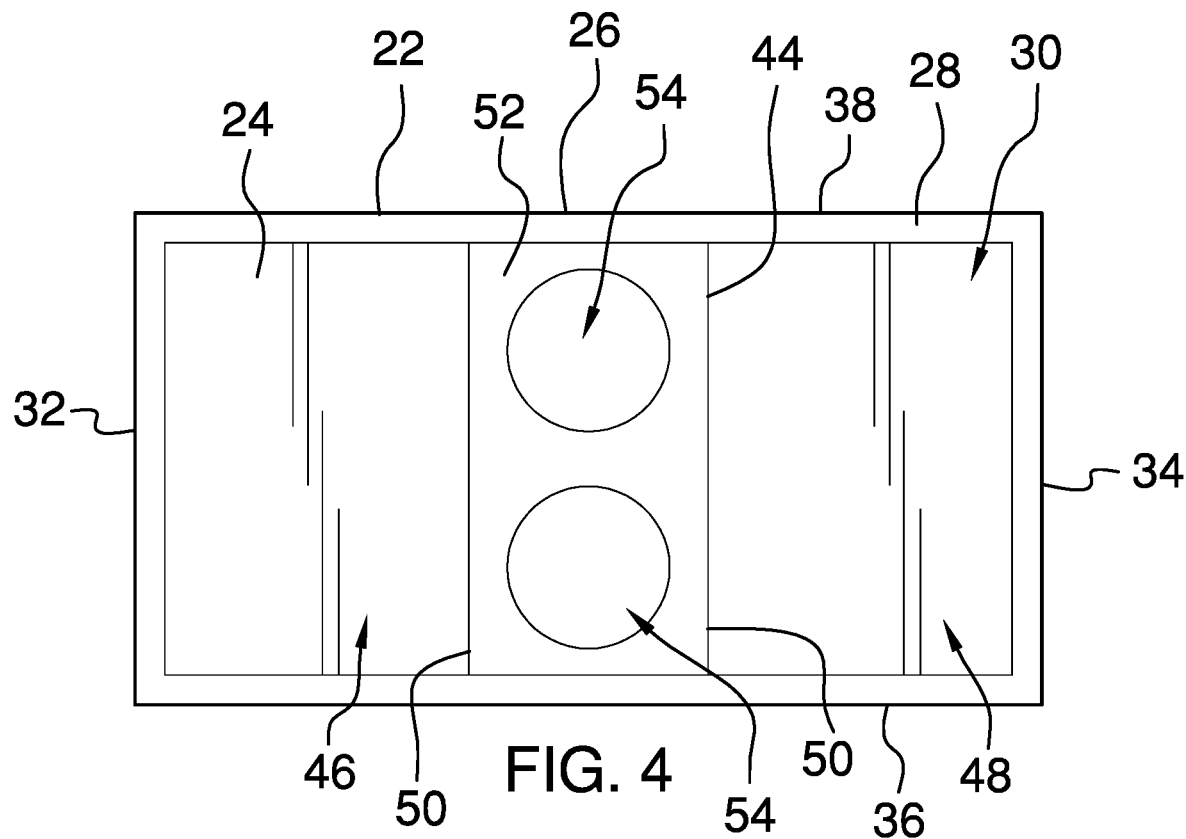
FIG. 4 is a top view of a storage unit of an embodiment of the disclosure.
Figure 5:
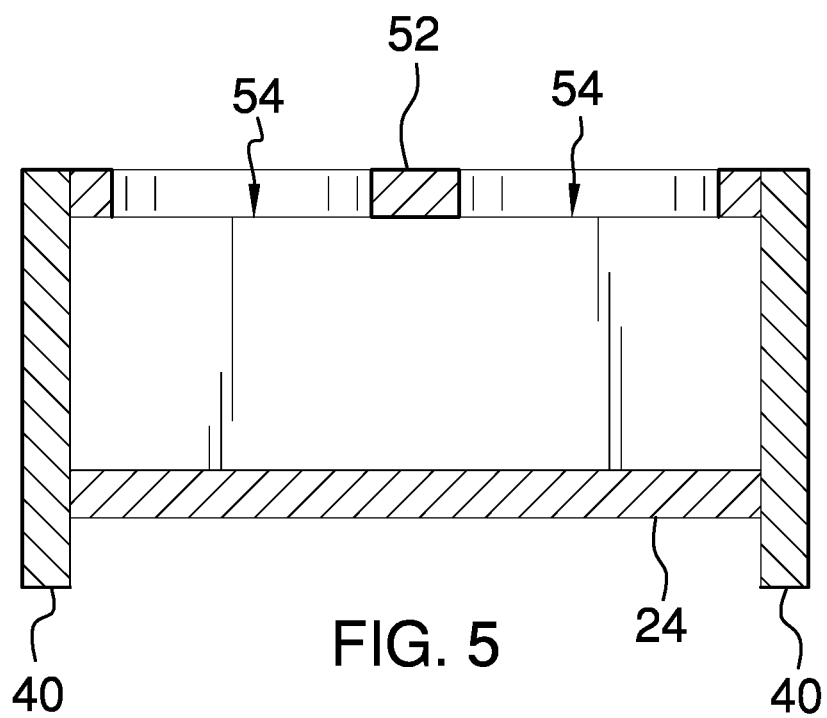
FIG. 5 is a cross sectional view taken along line 5-5 of FIG. 3 of an embodiment of the disclosure.

With reference now to the drawings, and in particular to FIGS. 1 through 6 thereof, a new console device embodying the principles and concepts of an embodiment of the disclosure and generally designated by the reference numeral 10 will be described.

As best illustrated in FIGS. 1 through 6, the center console system 10 generally comprises a vehicle 12 that has a front bench 14, a floor 16 and a center console 18 that is hingedly coupled to the front bench 14. The center console 18 is selectively positioned in a deployed position. The center console 18 is horizontally oriented and is centrally positioned on the front bench 14 when the center console 18 is in the deployed position. The center console 18 is selectively positioned in a stored position having the center console 18 being vertically oriented. The vehicle 12 may be a pickup with a model year of 2014 or later.

A storage unit 20 is selectively is provided and the storage unit 20 is positioned on the floor 16 when the center console 18 is positioned in the stored position. The storage unit 20 stores beverage containers and other objects when the center console 18 is in the stored position. In this way the center of the front bench 14 may be used or seating or the like without sacrificing storage space for beverage containers and the like that would otherwise be stored in the center console 18.

The storage unit 20 comprises a box 22 that has a bottom wall 24 and a perimeter wall 26 extending upwardly therefrom. The perimeter wall 26 has a distal edge 28 with respect to the bottom wall 24 to define an opening 30 into the box 22. The perimeter wall 26 has a front side 32, a back side 34, a first lateral side 36 and a second lateral side 38. A lip 40 extends downwardly from the bottom wall 24 and the lip 40 extends along the back side 34. Moreover, the lip 40 extends substantially along each of the first lateral side 36 and the second lateral side 38 to define a recessed portion 42 of the lip 40 that extends from the front side 32 toward the back side 34. The recessed portion 42 of the lip 40 is coplanar with a bottom surface of the bottom wall 24. Moreover, The lip 40 is positioned on the floor 16 in the vehicle 12 and the recessed portion 42 accommodates contours of the floor 16 thereby facilitating the bottom wall 24 to be oriented level in the vehicle 12.

The lip 40 is positioned on the floor 16 in the vehicle 12 and the recessed portion 42 accommodates contours of the floor 16. In this way the bottom wall 24 may be oriented level in the vehicle 12. The box 22 may have a length ranging between approximately 30.0 cm and 38.0 cm and a width ranging between approximately 15.0 cm and 20.0 cm. The bottom wall 24 may be spaced from the distal edge 28 of the perimeter wall 26 a distance ranging between approximately 7.5 cm and 10.0 cm.

A divider 44 extends between the first lateral side 36 and the second lateral side 38 of the perimeter wall 26 of the box 22 to define a first storage space 46 and a second storage space 48 in the box 22. The divider 44 has a pair of vertical walls 50 each extending between a horizontal wall 52. Each of the vertical walls 50 extends upwardly from the bottom wall 24 toward the distal edge 28 of the perimeter wall 26 and the horizontal wall 52 is aligned with the distal edge 28 of the perimeter wall 26. The horizontal wall 52 has a pair of apertures 54 extending therethrough to insertably receive a cylindrical object for storage. The apertures 54 are spaced apart from each other and are distributed between the first lateral side 36 and the second lateral side 38 of the perimeter wall 26. Each of the apertures 54 may have a diameter ranging between approximately 7.5 cm and 10.0 cm to accommodate soda cans, coffee cups and other beverage containers.

In use, the box 22 is positioned on the floor 16 in front of the front bench 14 when the center console 18 is positioned in the stored position. Thus, the beverage containers and other objects may be stored in an accessible location when the center console 18 is in the stored position. The box 22 is removable from the floor 16 at any time regardless of whether the center console 18 is in the deployed position or the stored position. Thus, the box 22 facilitates flexible storage options in a pickup that go beyond factory options.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A center console system being configured to store objects in a vehicle, said system comprising:
   a vehicle having a front bench, a floor and a center console being hingedly coupled to said front bench, said center console being selectively positioned in a deployed position having said center console being horizontally oriented and being centrally positioned on said front bench, said center console being selectively positioned in a stored position having said center console being vertically oriented; and
   a storage unit being selectively positioned on said floor when said center console is positioned in said stored position wherein said storage unit is configured to store beverage containers and other objects, said storage unit comprising a box having a bottom wall and a perimeter wall extending upwardly from a full perimeter edge of said bottom wall, said perimeter wall having a distal edge with respect to said bottom wall to define an opening into said box, said perimeter wall having a front side, a back side, a first lateral side and a second lateral side, said bottom wall having a recessed portion, said recessed portion having a forward section extending fully between said first lateral side and said second lateral side, said forward section of said recessed portion extending from said front side toward said back side less than a full length of each of said first lateral side and said second lateral side, said recessed portion having a rearward section extending from said forward section away from said front side toward said back side wherein said recessed portion is T-shaped, said bottom wall being positioned on said floor in said vehicle having said recessed portion accommodating contours of said floor thereby facilitating said bottom wall to be oriented level in said vehicle.

2. The system according to claim 1, further comprising a divider extending between said first lateral side and said second lateral side of said perimeter wall of said box to define a first storage space and a second storage space in said box.

3. The system according to claim 2, wherein said divider has a pair of vertical walls each extending between a horizontal wall, each of said vertical walls extending upwardly from said bottom wall toward said distal edge of said perimeter wall, said horizontal wall being aligned with said distal edge of said perimeter wall.

4. The system according to claim 2, wherein said horizontal wall has a pair of apertures extending therethrough wherein each of said apertures is configured to insertably receive a cylindrical object for storage, said apertures beings spaced apart from each other and being distributed between said first lateral side and said second lateral side of said perimeter wall.

5. A center console system being configured to store objects in a vehicle, said system comprising:
   a vehicle having a front bench, a floor and a center console being hingedly coupled to said front bench, said center console being selectively positioned in a deployed position having said center console being horizontally oriented and being centrally positioned on said front bench, said center console being selectively positioned in a stored position having said center console being vertically oriented; and
   a storage unit being selectively positioned on said floor when said center console is positioned in said stored position wherein said storage unit is configured to store beverage containers and other objects, said storage unit comprising a box having a bottom wall and a perimeter wall extending upwardly from a full perimeter edge of said bottom wall, said perimeter wall having a distal edge with respect to said bottom wall to define an opening into said box, said perimeter wall having a front side, a back side, a first lateral side and a second lateral side, said bottom wall having a recessed portion, said recessed portion having a forward section extending fully between said first lateral side and said second lateral side, said forward section of said recessed portion extending from said front side toward said back side less than a full length of each of said first lateral side and said second lateral side, said recessed portion having a rearward section extending from said forward section away from said front side toward said back side wherein said recessed portion is T-shaped, said bottom wall being positioned on said floor in said vehicle having said recessed portion accommodating contours of said floor thereby facilitating said bottom wall to be oriented level in said vehicle; and and a divider extending between said first lateral side and said second lateral side of said perimeter wall of said box to define a first storage space and a second storage space in said box, said divider having a pair of vertical walls each extending between a horizontal wall, each of said vertical walls extending upwardly from said bottom wall toward said distal edge of said perimeter wall, said horizontal wall being aligned with said distal edge of said perimeter wall, said horizontal wall having a pair of apertures extending therethrough wherein each of said apertures is configured to insertably receive a cylindrical object for storage, said apertures beings spaced apart from each other and being distributed between said first lateral side and said second lateral side of said perimeter wall.

* * * * *